United States Patent
Wade

(10) Patent No.: US 10,133,071 B2
(45) Date of Patent: Nov. 20, 2018

(54) REPLACEABLE OPTICAL ELEMENT FOR NEAR EYE DISPLAY

(71) Applicant: INTEL CORPORATION, Santa Clara, CA (US)

(72) Inventor: Andrew Gardner Wade, San Clemente, CA (US)

(73) Assignee: INTEL CORPORATION, Santa Clara, CA (US)

( * ) Notice: Subject to any disclaimer, the term of this patent is extended or adjusted under 35 U.S.C. 154(b) by 20 days.

(21) Appl. No.: 15/279,371

(22) Filed: Sep. 28, 2016

(65) Prior Publication Data

US 2018/0088328 A1    Mar. 29, 2018

(51) Int. Cl.

| G03H 1/00 | (2006.01) |
| G02B 27/01 | (2006.01) |
| G02B 27/62 | (2006.01) |
| G02B 5/32 | (2006.01) |
| H04N 9/31 | (2006.01) |
| G06T 1/20 | (2006.01) |

(52) U.S. Cl.
CPC .......... *G02B 27/0103* (2013.01); *G02B 5/32* (2013.01); *G02B 27/0172* (2013.01); *G02B 27/62* (2013.01); *G03H 1/0005* (2013.01); *G02B 2027/0178* (2013.01); *G06T 1/20* (2013.01); *H04N 9/3129* (2013.01); *H04N 9/3179* (2013.01)

(58) Field of Classification Search
CPC ....................................................... G03H 1/20
USPC ............ 359/13, 15; 356/153, 154, 401, 615; 353/11, 40; 156/256
See application file for complete search history.

(56) References Cited

U.S. PATENT DOCUMENTS

| 5,776,286 A | * | 7/1998 | Yeh | G03H 1/20 156/256 |
| 7,436,560 B2 | * | 10/2008 | Chen | B32B 17/10036 359/13 |
| 2016/0037144 A1 | * | 2/2016 | Schultz | G03B 21/28 348/745 |

* cited by examiner

*Primary Examiner* — Audrey Y Chang

(57) ABSTRACT

Disclosed herein is a lens for a wearable projection system. The lens includes a lens blank and a holographic optical element. The holographic optical element can be removably attached to the lens. The holographic optical element is aligned to a position on the lens surface based on temporary alignment marks projected onto the lens.

22 Claims, 11 Drawing Sheets

*800*

```
┌─────────────────────────────────────────────────────────────────────┐
│                         Provide a lens.                              │
│                              810                                     │
└─────────────────────────────────────────────────────────────────────┘
                                  │
                                  ▼
┌─────────────────────────────────────────────────────────────────────┐
│              Project at least one alignment mark onto the lens.      │
│                              820                                     │
└─────────────────────────────────────────────────────────────────────┘
                                  │
                                  ▼
┌─────────────────────────────────────────────────────────────────────┐
│ Attach a holographic optical element (HOE) to the lens and align the HOE on the lens based │
│                    on the at least one alignment mark.               │
│                              830                                     │
└─────────────────────────────────────────────────────────────────────┘
```

```
┌─────────────────────────────────────────────────────────────────────┐
│ Remove a holographic optical element (HOE) from a surface of a lens.│
│                                 910                                 │
└─────────────────────────────────────────────────────────────────────┘
                                   │
                                   ▼
┌─────────────────────────────────────────────────────────────────────┐
│                    Provide a second lens or a second HOE.           │
│                                 920                                 │
└─────────────────────────────────────────────────────────────────────┘
                                   │
                                   ▼
┌─────────────────────────────────────────────────────────────────────┐
│ Project at least one alignment mark onto the surface of the lens or │
│                    a surface of the second lens.                    │
│                                 930                                 │
└─────────────────────────────────────────────────────────────────────┘
                                   │
                                   ▼
┌─────────────────────────────────────────────────────────────────────┐
│ Attach the HOE to the second lens or the second HOE to the lens and │
│  align the HOE or the second HOE on the surface based on the at     │
│                    least one alignment mark.                        │
│                                 940                                 │
└─────────────────────────────────────────────────────────────────────┘
```

REPLACEABLE OPTICAL ELEMENT FOR NEAR EYE DISPLAY

TECHNICAL FIELD

Embodiments herein generally relate to head worn displays and heads up displays; and in particular to lenses for such displays.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

BRIEF DESCRIPTION OF THE DRAWINGS

FIG. 8 illustrates a first example logic flow.

FIG. 9 illustrates a second example logic flow.

DETAILED DESCRIPTION

Figure 1:
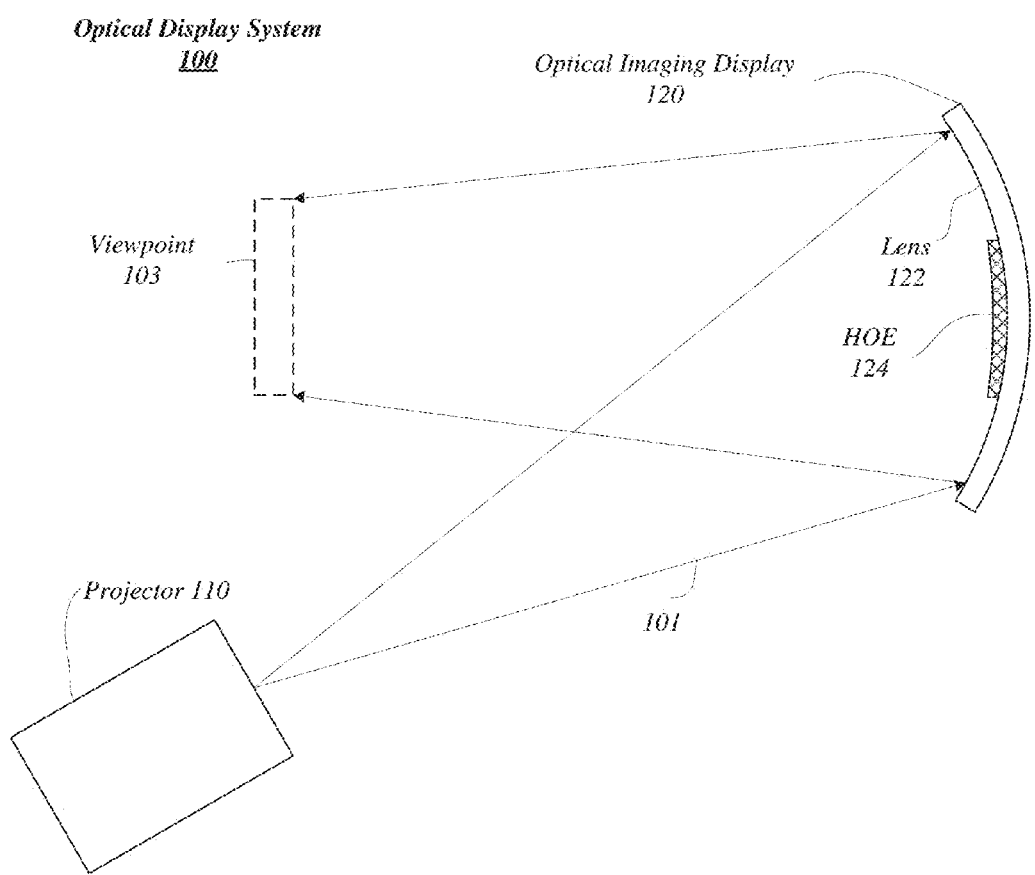
FIG. 1 illustrates an example first system.

Various embodiments may be generally directed to head worn displays (HWDs) and specifically to a lens of a head worn display including a semi-permanent or "serviceable" optical element. In some examples, HWDs can be implemented to provide a projection system along with a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

Conventionally, the HOE is laminated onto an exterior surface of the lens. In particular, the HOE is laminated over an entire surface of the backside of the lens and then the lens shaped or ground for both (1) fit a particular frame and (2) position the HOE for a specific distance between pupils of a user's eyes. As such, multiple different lens configurations are required.

The present disclosure provides to pre-cut the HOE and then to position and affix the HOE to a lens blank. In some examples, the HOE can be affixed using a reversible process, for example, to provide for servicing the lens and HOE combination if it is damaged. For example, an HOE can be removed and applied to a new lens blank (e.g., to change frames, to change lens prescription, to replace a scratched or cracked lens, or the like) or an HOE can be removed and a new HOE applied to an existing lens to change optical characteristics of the HWD. As such, existing lens inventory can be utilized.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 illustrates an embodiment of a system 100. System 100 may include a projector 110 and an optical imaging display 120. In general, the components of system 100 operate to provide a user with a computer-mediated reality. For example, system 100 may overlay computer generated graphics onto a user's view of the world. In some examples, system 100 may provide a virtual reality view.

Optical imaging display 120 includes a projection surface 122 and holographic optical element (HOE) 124 (also referred to as a holographic optical combiner). In general, the HOE 124 is serviceable, or that is, can be attached to a projection surface 122 and then removed and replaced or attached to another projection surface 122. Alignment and attachment of the HOE 124 to projection surface 122 is described in greater detail below.

As used herein, projection surface 122 is referred to as lens 122 interchangeably. However, lens 122 may not be a lens as traditionally, used. For example, lens 122 can be a windshield, a helmet visor, or other projection surface in which a computer-mediated reality is desired or in which the system 100 can be implemented. As such, embodiments are not limited in this context.

During operation, the projection system 110 projects light 101 onto lens 122. The projected light can correspond to virtual images. The lens 122, and specifically the HOE 123, reflects (or redirects) the light towards a viewpoint 103 (or exit pupil). More particularly the HOE 122 reflects the projected light 101. With some examples, the lens 122 and the HOE 124 redirect the projected images and also transmit light from the external environment to the viewpoint 103. As such, a virtual image and a real world image may be presented at the viewpoint 103. It is noted, that although the device 100 is depicted with a single projection system 110 and optical imaging display 120, the device 100 may include multiple projection systems 110 and optical imaging displays 120 (e.g., lenses 122 and HOEs 124) to provide multiple viewpoints 103 (e.g., for a multiple eye display, or the like).

With some examples, the projector 110 may comprise a light source, battery, and projector to project images onto the HOE 124. For example, the projector 110 may comprise a scanning mirror to reflect and redirect light from the light source onto the HOE 124. In some examples, the scanning mirror may be a microelectromechanical system (MEMS) based scanning mirror. In some examples, the projector 110 may comprise a panel micro display (e.g., light emitting diode (LED) panel, liquid crystal display (LCD) panel, or the like). Additionally, the projector 110 may include control and graphics processing components configured to cause the projector 110 to emit light from the light source and to scan and/or project the emitted light onto the lens 122 to project an image onto the HOE 124.

Figure 2:
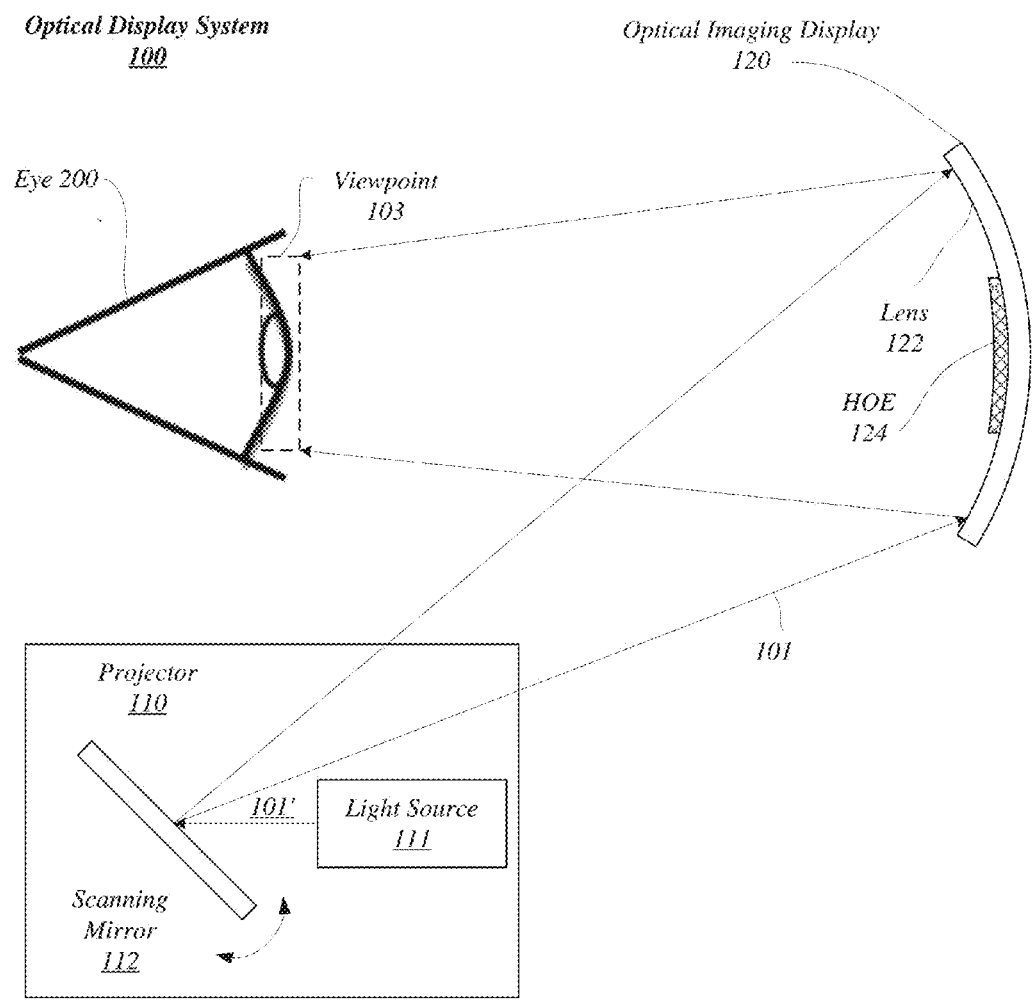
FIG. 2 illustrates the example system of FIG. 1 in conjunction with a user eye.

FIG. 2 illustrates an embodiment of system 100 in conjunction with an eye 200. In various embodiments, optical imaging display 120 may reflect an image projected by projector 110 towards an eye 200 of a user. In various such embodiments, when eye 200 is located within viewpoint 103, one or more portions of the reflected image may be visible to the eye 200.

In some examples, projector 110 can include a light source 111 to emit a light beam 101' of at least one wavelength. Alternatively, the projector 110 may receive light emitted from a source not included in the projector 110. The light beam 101' is incident on (or received by) a scanning mirror 112. The scanning mirror 112 rotates about a number of axes to scan the light beam 101' as projected light 101 across lens 122 and particularly across HOE 124. In general, scanning mirror 112 scans the received light beam 101' onto (or across) the lens 122 while the light source 111 modulates or modifies the intensity of the light beam 101' to correspond to a digital image. Thus, a virtual or mediated reality display can be presented as the viewpoint 103 and may be perceived by a user via eye 200.

Figure 3:
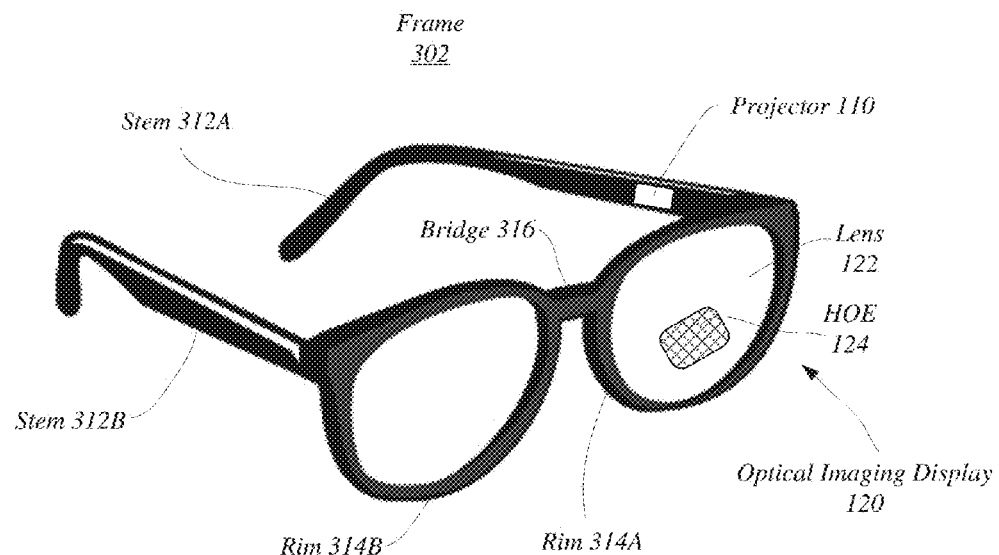
FIG. 3 illustrates an example second system.

FIG. 3 illustrates an embodiment of wearable device 300. Wearable device 300 can include a wearable frame 302, which can couple with projector 110 and optical imaging display 120. In various embodiments, wearable frame 302 may hold projector 110 in a certain position with respect to display 120. For example, wearable frame 302 may hold projector 110 at a spacing and angle with respect to display 120 such that images are appropriately reflected by HOE 124 to be viewed by the eye (e.g., eye 200) of a user. In some embodiments, wearable frame 302 may position the eye 200 (refer to FIG. 2) at a spacing with respect to display 120 such that the eye 200 of a user is appropriately located in viewpoint 103 (refer to FIGS. 1 and 2). Embodiments are not limited in this context.

Wearable frame 302 may include stems 312A, 312B, rims 314A, 314B, and bridge 316. Stem 312A may couple to projector 110 and rim 314A. Rim 314A may couple to display 120. For example, display 120 may include lens 122 held by rim 314A. In some embodiments the lens 122 may be plastic. HOE 124 can be affixed to lens 122 as described herein. Rim 314A may be connected to rim 314B by bridge 316. In various embodiments, wearable frame 302 may include any device able to properly position projector 110 with respect to display 120 to enable the desired reflection of a projected image by the field imaging display 120. For instance, wearable frame 302 may include one or more of eyeglass frames, a headband, a hat, a mask, a helmet, sunglasses, or similar head worn devices. Further, the number and position of projector 110 and display 120 may be altered without departing from the scope of this disclosure. For example, wearable frame 302 may include two projectors and two displays to enable computer-augmented reality for both eyes of a user. As depicted, in some embodiments, projector 110 may be embedded in stem 312A of a pair of glasses. In other embodiments, projector 110 may be embedded in rim 314A or bridge 316 of the wearable frame 302.

It will be appreciated that the components of wearable frame 102 and their arrangement illustrated in FIG. 3 is exemplary and other components and arrangements may be used without departing from the scope of this disclosure. For example, wearable frame 302 may include control circuitry and a power source. In some embodiments, the power source may include a battery or similar power storage device and provide operational power to wearable frame 302. Control circuitry may include logic and/or hardware to implement one or more functional aspects of system 100. For instance, control circuitry may enable wearable frame 302 to wirelessly communicate with one or more networks.

In some examples, lens 122 is an at least partially transparent surface with the HOE 124 affixed onto an inner (e.g., user facing) surface of lens 122. During operation, the lens 122 and the HOE 124 may transmit light incident on a real world side of the lens 122 to provide a real world view. In some examples, the lens 122 is opaque and the lens 122 does not transmit light incident on a real world side of the lens 122. With some examples, the lens 122 may be sunglass lenses to reduce an amount or type of light transmitted through the lenses, for example, by polarization or absorption. With some examples, the lenses 122 may be prescription lenses to correct or augment light perceived from the real world and/or the virtual image.

Furthermore, as noted, although reference herein is made to lens and particularly to a pair of eye glasses having a lens 122 and HOE 124 as described. The present disclosure can be applied to other viewing apparatus, such as, for example, automobile windshields, or the like.

Figure 4B:
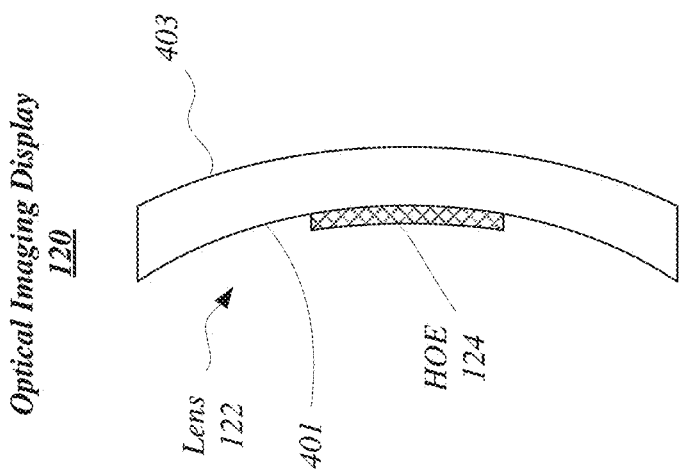
FIGS. 4A-4B illustrates an example lens and HOE.
Figure 4A:
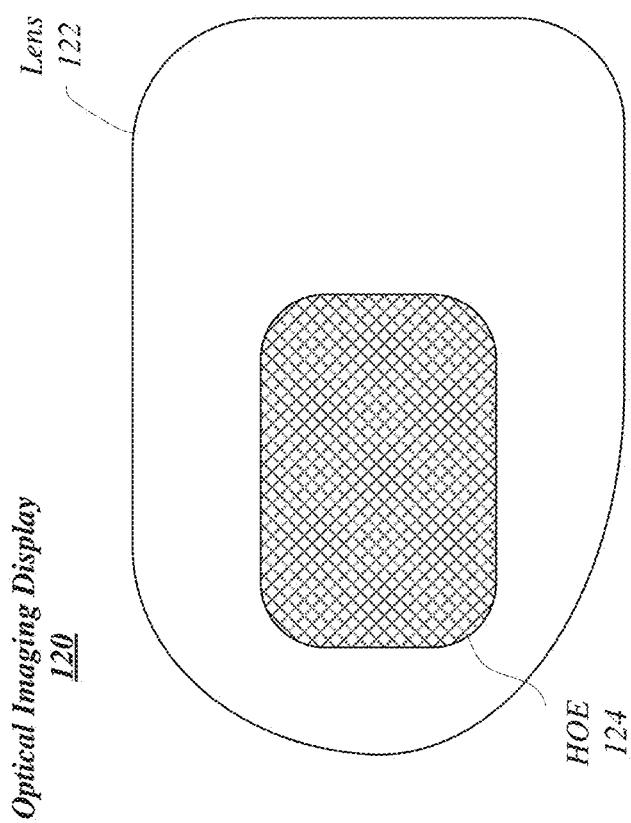

FIGS. 4A-4B depict a backside and cut-away side view, respectively, of an example lens 122 and HOE 124. The lens 122 can have a first area larger than the area of the HOE 124. Said differently, the HOE 124 may be smaller dimensionally than the lens 122. Accordingly, the HOE 124 can be positioned within a portion of the area of the lens 122. In some examples, the lens 122 can be a lens for an eyewear frame (e.g., frame 302, or the like). As such, the lens 122 can have a general eyewear lens shape. In general, the HOE 124 is formed to reflect, diffract and/or direct light incident on a first side (e.g., side 401) while allowing light incident on a second opposite side (e.g., side 403) to be transmitted through the HOE. In some examples, the HOE 124 can be formed by exposing a photosensitive material to light beams to change an optical characteristic of the photosensitive material and then curing the material. The present disclosure provides that an HOE, such as, for example, the HOE 124 is pre-formed and subsequently attached to the backside 401 of the lens 122. For example, the HOE 124 can be attached using a pressure sensitive adhesive, or the like.

It is noted, the HOE 124 may be positioned in a specific location within the area of lens 122. Said differently, the HOE 124 may be aligned to a specific location in the viewable area of lens 122 to provide the viewpoint 103 at a particular location.

Figure 5A:
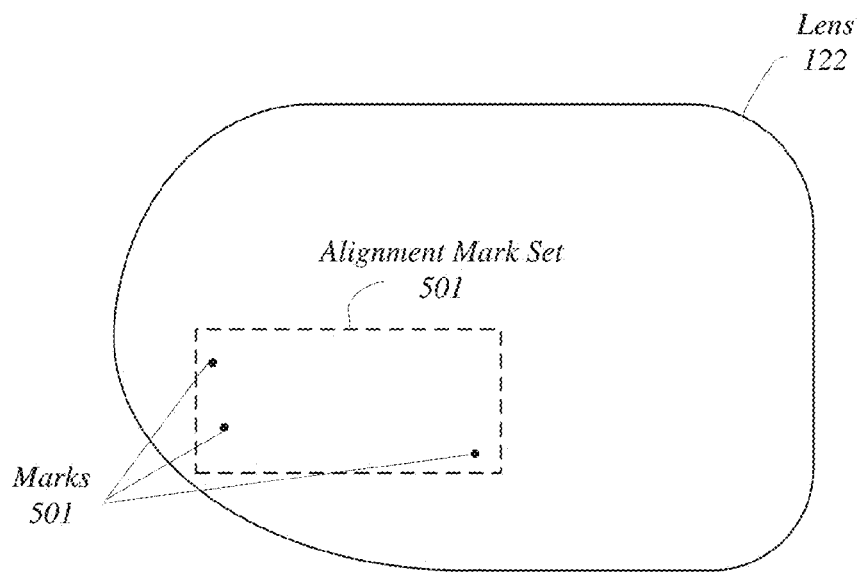
FIGS. 5A-5B illustrates an example lens and alignment mark set.
Figure 5B:
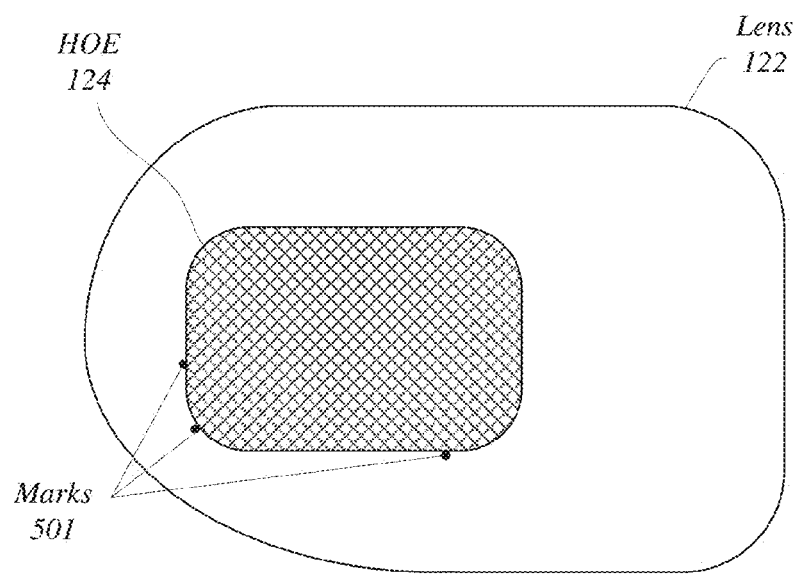

FIGS. 5A-5B depict lens 122 and HOE 124 aligned to a specific location respective to lens 122. In particular, FIG. 5A depicts lens 122 and a set of alignment marks 500. The set of alignment marks comprises marks 501. In some examples, marks 501 can be temporarily positioned on lens 122, for example, using a laser alignment system (refer to FIG. 7) or the like. It is noted, that the number of marks 501 are depicted at a quantity to facilitate understanding. However, the present disclosure can be implement with a set of alignment marks 500 having more or less marks 501 than depicted. Furthermore, the position of the marks 501 relative to each other may depend upon a shape of the HOE 124. More specifically, the marks 501 are temporarily placed on lens 122 to facilitate attachment of the HOE 124 to lens 122 and alignment of HOE 124 to a particular position respective to lens 122 to provide a viewpoint 103 are a desired location.

Figure 6:
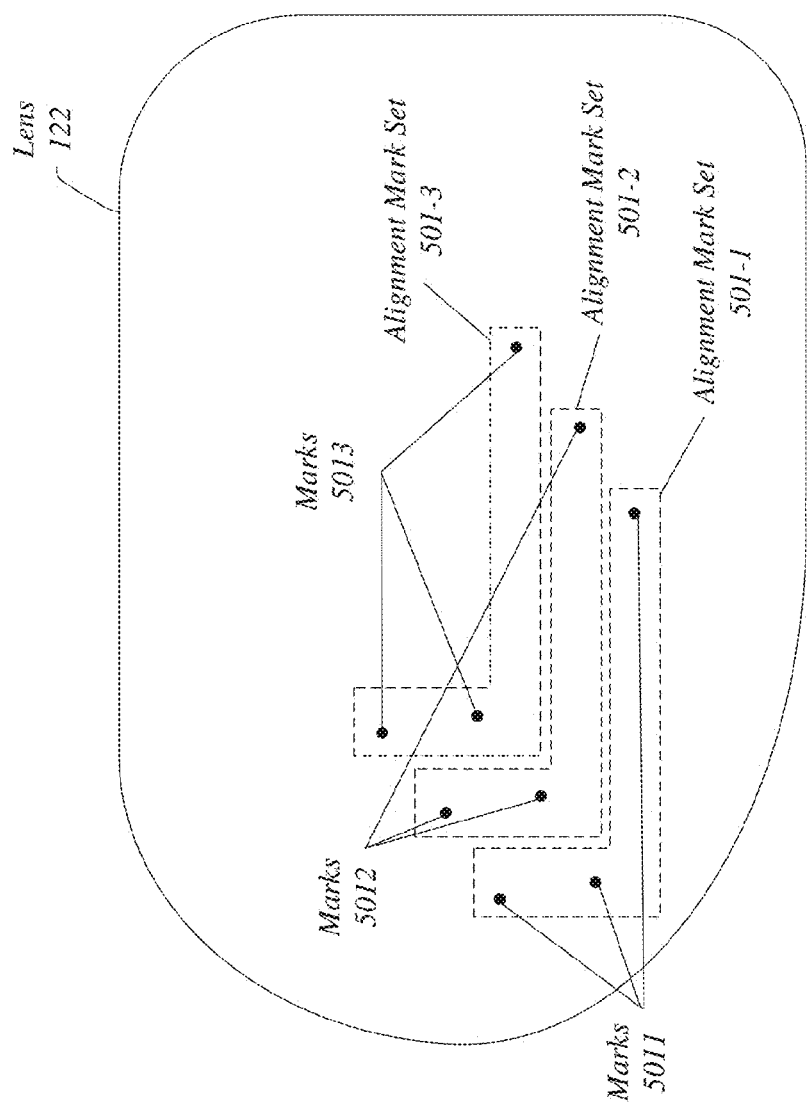
FIG. 6 illustrates an example lens.

Turning more specifically to FIG. 5B, the HOE 124 is depicted attached to lens 122 and aligned to marks 501. In some examples, the alignment and/or positioning of HOE 124 respective to lens 122 can vary depending upon the intended user, such as, for example, depending upon a distance between the user's pupils. FIG. 6 depicts lens 122 with a number of alignment mark sets 500 depicted is different positions on the lens 122. In particular, a first alignment mark set 500-1, second alignment mark set 500-2 and third alignment mark set 500-3 are depicted. Each alignment mark set includes a number of alignment marks. For example, set 500-1 includes marks 5011, set 500-2 includes marks 5012 and set 500-3 includes marks 5013. An HOE 124 (not shown) can be attached to lens 122 based on any one of the set of marks 500 to form a lens 122 and HOE 124 combination to provide a viewpoint 103 at a desired, or a specific, location relative to the lens 122.

Figure 7:
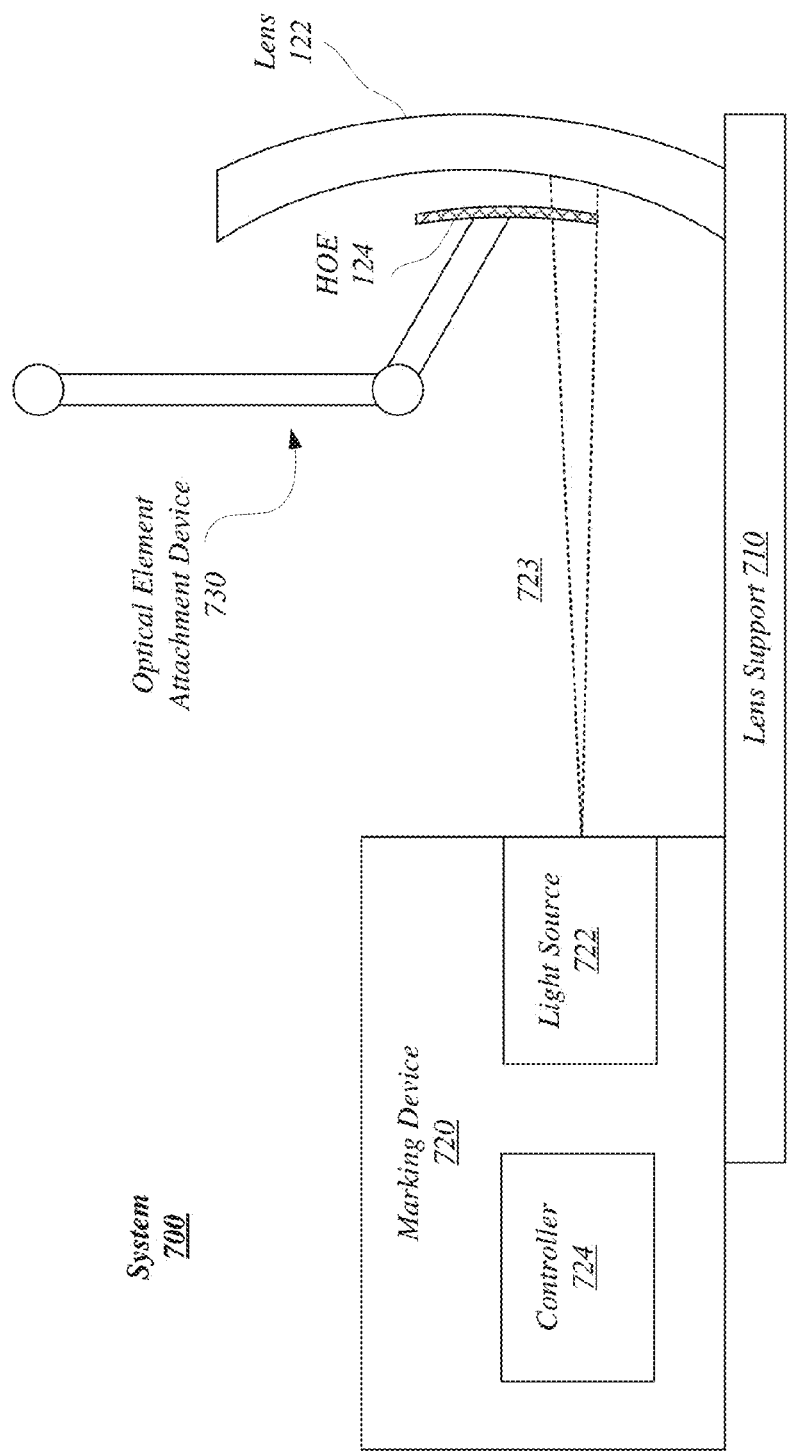
FIG. 7 illustrate an example HOE attachment system.

FIG. 7 depicts a block diagram of an optical element and lens alignment system 700 arranged according to examples of the present disclosure. The system 700 includes a lens support 710, a marking device 720 and an optical element attachment device 730. In general, the lens support 710 supports lens 122 while marking device 720 projects alignment marks (refer to FIGS. 5A-5B and FIG. 6) onto lens 122. Optical element attachment device 730 can then align HOE 124 to alignment marks and attach HOE 124 to lens 122.

In some examples, lens support can be a tray or table including a clamp (not shown) arranged to hold lens 122 in a fixed position relative to marking device 720 and/or attachment device 730. In some examples, marking device 720 can be a projector, such as, a laser projector, to project alignment marks, or a set of alignment marks onto a particular location on lens 122. In some examples, marking device can include a light source 722 and a controller 724. The controller 724 can include logic and or feature to direct light source 722 to project light 723 to form alignment marks on a specific location (e.g., refer to FIG. 6) of a backside of lens 122. Controller 724 can receive an indication from an operator as to a desired viewpoint location and/or alignment mark location and direct light source 722 to project alignment marks onto lens 122 in a location based on the desired viewpoint and/or mark location. In some examples, controller 724 can receive an indication of a user's inter-pupilary distance (IPD), that is the distance between a user's pupils, and can direct light source 722 to project alignment marks onto lens 122 in a location based on the specified IPD.

FIGS. 8-9 depict logic flows for providing a lens and HOE according to at least one example of the present disclosure. For example, FIG. 8 depicts a logic flow 800 for attaching an HOE to a lens while FIG. 9 depicts replacing an HOE or a lens from a lens and HOE combination according to at least one example of the present disclosure. In some examples, the logic flows 800 and/or 900 can be implemented to form lens 122 and HOE 124 combination as described herein. The logic flows 800 and 900 are described with reference to the lens 122 and HOE 124 as well as the system 700 for purposes of illustration only and not to be limiting.

Turning more particularly to FIG. 8, the logic flow 800 may begin at block 810. At block 810 "provide a lens" a lens can be provided. In some examples, the provided lens may be a lens, such as, lens 122, shaped for a frame, such as, frame 302. In some examples, at block 810, a lens and HOE can be provided. For example, lens 122 and HOE 124 can be provided. With some examples, lens 122 can be pre-shaped, or that is, already shaped to fit a wearable frame (e.g., frame 302, or the like). In some examples, HOE 124 can be cut (e.g., die cut, or the like) from a sheet of holographic optical elements or from a sheet of optically sensitive material which has been exposed to one or more light beams to provide optical characteristics to reflect and direct light to a viewpoint and described herein.

Continuing to block 820 "project at least one alignment mark onto the lens" at least one alignment mark is projected onto the lens. For example, marking device, and particularly light source 722 can project alignment mark(s) (e.g., marks 501) onto lens 122.

Continuing to block 830 "attach a holographic optical element (HOE) to the lens and align the HOE on the lens based on the at least one alignment mark" the HOE can be attached to the lens and aligned on a surface of the lens based on the alignment marks. For example, the attachment device 730 can attach the HOE 124 onto a surface (e.g., surface 401) of lens 122 and align the Hoe 124 on the surface of the lens based on the alignment marks (e.g., marks 501).

Turning more particularly to FIG. 9, the logic flow 900 may begin at block 910. At block 910 "remove a holographic optical element (HOE) from a surface of a lens" an HOE can be removed from a surface of a lens. For example, the Hoe 124 can be removed from a surface of the lens 122.

Continuing to block 920 "provide a second lens or a second HOE" a second lens or a second HOE can be provided. For example, if the original lens 122 is damaged (e.g., scratched, cracked, or the like) a second lens can be provided. However, if the original HOE is damaged (e.g., scratched, cracked, or the like) a second HOE can be provided.

Continuing to block 930 "project at least one alignment mark onto the lens or the second lens" at least one alignment mark is projected onto either the lens or the second lens if provided. For example, to replace the lens 122, the marking device 720, and particularly light source 722 can project alignment mark(s) (e.g., marks 501) onto the second lens 122. However, to replace the Hoe 124, marking device 720, can project alignment mark(s) onto lens 122.

Continuing to block 940 "attach the HOE to the second lens or the second HOE to the lens and align the HOE or the second HOE on the surface based on at least one alignment mark" the HOE (or second HOE as may be the case) can be attached to the second lens (or original lens) and aligned on a surface of the second lens (or lens) based on the alignment marks.

Figure 10:
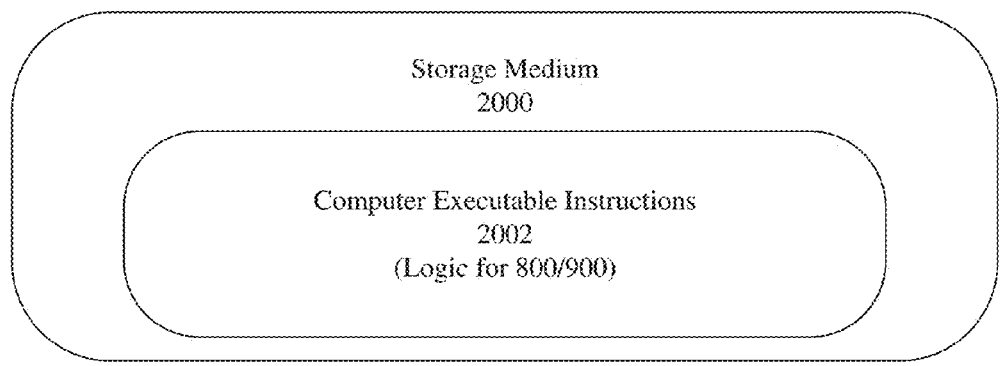
FIG. 10 illustrates an example computer readable medium.

FIG. 10 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 600. For example, the storage medium 2000 may store various types of computer executable instructions to implement technique 800. For example, the storage medium 2000 may store various types of computer executable instructions to implement technique 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
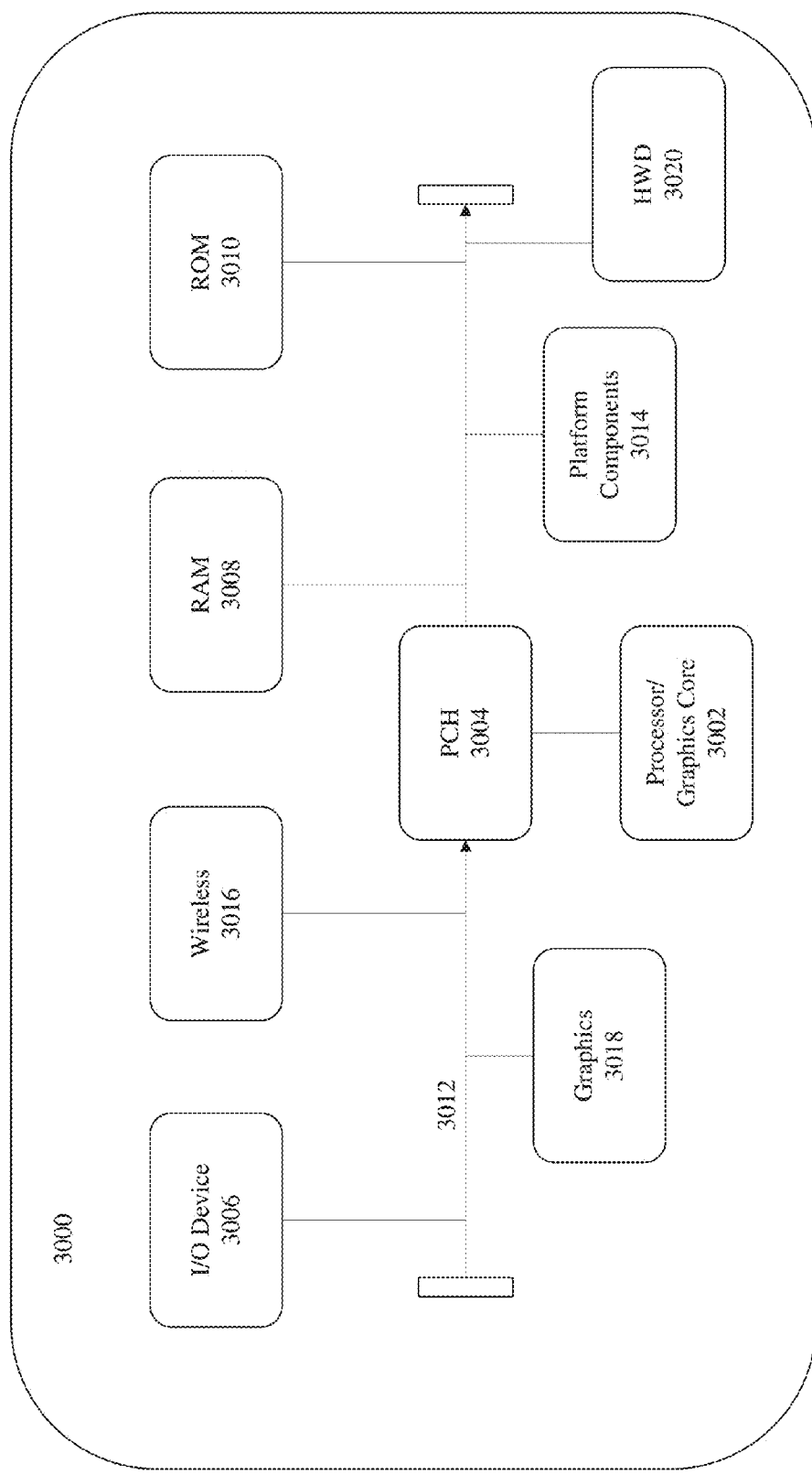
FIG. 11 illustrates a third example system.

FIG. 11 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, HWD 3020 (e.g., HWD 100, display 120, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The disclosure now turns to providing example implementations.

Example 1

A method to manufacture a wearable display lens, comprising: providing a lens; projecting at least one alignment mark onto the lens; and attaching a holographic optical element (HOE) to the lens and aligning the HOE based on the at least one alignment mark.

Example 2

The method of example 1, attaching the HOE to the lens comprising attaching the HOE to a backside surface of the lens using a pressure sensitive adhesive.

Example 3

The method of example 1, comprising cutting the HOE from an HOE sheet comprising a plurality of HOEs.

Example 4

The method of example 1, comprising: removing the HOE from the lens; projecting the at least one alignment mark onto the lens; and attaching a second HOE to the lens and aligning the second HOE based on the at least one alignment mark.

Example 5

The method of example 1, comprising: removing the HOE from the lens; providing a second lens; projecting the at least one alignment mark onto the second lens; and attaching the HOE to the second lens and aligning the HOE based on the at least one alignment mark.

Example 6

The method of example 1, comprising projecting a plurality of alignment marks onto the lens.

Example 7

The method of example 6, comprising aligning the HOE to the lens based on the plurality of alignment mark.

Example 8

The method of example 6, comprising projecting the plurality of alignment marks onto the lens based on a specific viewpoint location, the HOE to receive light corresponding to a projected image and provide the projected image at the specific viewpoint.

Example 9

The method of example 6, comprising projecting the plurality of alignment marks onto the lens based on a specific interpulilary distance.

Example 10

The method of any one of examples 1 to 9, the lens a glasses lens, a goggle lens, a helmet visor, or a vehicle windshield.

Example 11

A lens manufactured according to the method of any one of examples 1 to 9.

Example 12

A system for projecting an image, the system comprising: a frame; a lens coupled to the frame, the lens comprising a holographic optical element (HOE) attached to a first surface of the lens, the HOE aligned to a position on the first surface of the lens based on at least one alignment mark temporarily projected onto the lens; and a projector coupled to the frame, the projector to project light onto the HOE, the HOE to direct the projected light to a viewpoint.

Example 13

The system of example 12, the HOE attached to the first surface of the lens using a pressure sensitive adhesive.

Example 14

The system of example 12, the HOE cut from an HOE sheet comprising a plurality of HOEs.

Example 15

The system of example 12, the HOE aligned to the position on the first surface of the lens based on a plurality of alignment marks temporarily projected onto the lens.

Example 16

The system of example 15, the plurality of alignment marks projected onto a plurality of alignment mark positions on the lens based on a specified location for the viewpoint.

Example 17

The system of example 15, the plurality of alignment marks projected onto a plurality of alignment mark positions on the lens based on a specific interpulilary distance.

Example 18

The system of example 12, the lens removable from the frame.

Example 19

The system of example 18, the HOE removably attached to the first surface of the lens.

Example 20

The system of example 12, the lens a glasses lens, a goggle lens, a helmet visor, or a vehicle windshield.

Example 21

The system of example 20, the frame a glasses frame, a goggles frame, a helmet, or a vehicle windshield frame.

Example 22

The system of any one of examples 12 to 21, comprising a battery electrically coupled to the projector.

Example 23

The system of any one of examples 12 to 21, comprising a graphic processor to receive an image information element to include an indication of an image and to send a display control signal to the projector to cause the projector to project one or more pixels corresponding to the image onto the HOE.

Example 24

A projection system lens, comprising: a lens; and a holographic optical element (HOE) attached to a first surface of the lens, the HOE aligned to a position on the first surface of the lens based on at least one alignment mark temporarily projected onto the lens.

Example 25

The projection system lens of example 24, the HOE attached to the first surface of the lens using a pressure sensitive adhesive.

Example 26

The projection system lens of example 24, the HOE cut from an HOE sheet comprising a plurality of HOEs.

Example 27

The projection system lens of example 24, the HOE aligned to the position on the first surface of the lens based on a plurality of alignment marks temporarily projected onto the lens.

Example 28

The projection system lens of example 27, the plurality of alignment marks projected onto a plurality of alignment mark positions on the lens based on a specified location for a viewpoint.

Example 29

The projection system lens of example 27, the plurality of alignment marks projected onto a plurality of alignment mark positions on the lens based on a specific interpulilary distance.

Example 30

The projection system lens of example 24, the HOE removably attached to the first surface of the lens.

Example 31

The projection system lens of example 24, the lens a glasses lens, a goggle lens, a helmet visor, or a vehicle windshield.

What is claimed is:

1. A method to manufacture a wearable display lens, comprising:
    providing a lens;
    projecting at least one alignment mark onto the lens based on a specific viewpoint location; and
    attaching a holographic optical element (HOE) to the lens and aligning the HOE based on the at least one alignment mark, the HOE to receive light corresponding to a projected image and provide the projected image at the specific viewpoint.

2. The method of claim 1, attaching the HOE to the lens comprising attaching the HOE to a backside surface of the lens using a pressure sensitive adhesive.

3. The method of claim 1, comprising cutting the HOE from an HOE sheet comprising a plurality of HOEs.

4. The method of claim 1, the HOE being a first HOE, the method comprising:
    removing the first HOE from the lens;
    projecting the at least one alignment mark onto the lens; and
    attaching a second HOE, different than the first HOE, to the lens and aligning the second HOE based on the at least one alignment mark.

5. The method of claim 1, the lens being a first lens, the method comprising:
    removing the HOE from the first lens;
    providing a second lens;
    projecting the at least one alignment mark onto the second lens; and
    attaching the HOE to the second lens and aligning the HOE based on the at least one alignment mark.

6. The method of claim 1, comprising projecting a plurality of alignment marks onto the lens.

7. The method of claim 6, comprising aligning the HOE to the lens based on the plurality of alignment marks.

8. The method of claim 6, comprising projecting the plurality of alignment marks onto the lens based on a specific interpulilary distance.

9. The method of claim 1, the lens a glasses lens, a goggle lens, a helmet visor, or a vehicle windshield.

10. A lens manufactured according to the method of claim 1.

11. A system for projecting an image, the system comprising:
    a frame;
    a lens coupled to the frame, the lens comprising a holographic optical element (HOE) removably attached to a first surface of the lens, the HOE aligned to a position on the first surface of the lens based on at least one alignment mark temporarily projected onto the lens, the at least one alignment mark projected based on a specified location for a viewpoint; and
    a projector coupled to the frame, the projector to project light onto the HOE, the HOE to direct the projected light to the viewpoint.

12. The system of claim 11, the HOE attached to the first surface of the lens using a pressure sensitive adhesive.

13. The system of claim 11, the HOE cut from an HOE sheet comprising a plurality of HOEs.

14. The system of claim 11, the HOE aligned to the position on the first surface of the lens based on a plurality of alignment marks temporarily projected onto the lens.

15. The system of claim 14, the plurality of alignment marks projected onto a plurality of alignment mark positions on the lens based on a specific interpulilary distance.

16. The system of claim 11, the lens removable from the frame.

17. The system of claim 11, the lens a glasses lens, a goggle lens, a helmet visor, or a vehicle windshield and the frame a glasses frame, a goggles frame, a helmet, or a vehicle windshield frame.

18. The system of claim 11, comprising:
    a battery electrically coupled to the projector; and
    a graphic processor to receive an image information element to include an indication of an image and to send a display control signal to the projector to cause the projector to project one or more pixels corresponding to the image onto the HOE.

19. A projection system lens, comprising:
    a lens; and
    a holographic optical element (HOE) removably attached to a first surface of the lens, the HOE aligned to a position on the first surface of the lens based on at least one alignment mark temporarily projected onto the lens, the at least one alignment mark projected based on a specified location for a viewpoint.

20. The projection system lens of claim 19, the HOE cut from an HOE sheet comprising a plurality of HOEs.

21. The projection system lens of claim 19, the HOE aligned to the position on the first surface of the lens based on a plurality of alignment marks temporarily projected onto the lens.

22. The projection system lens of claim 21, the plurality of alignment marks projected onto a plurality of alignment mark positions on the lens based on a specific interpulilary distance.

* * * * *